United States Patent
Nakas et al.

(10) Patent No.: US 8,479,484 B2
(45) Date of Patent: Jul. 9, 2013

(54) METHOD FOR ELIMINATING LEAFSTALKS USING CONTINUOUS AND DISCONTINUOUS BELTS

(75) Inventors: Christine Nakas, Le Poiré-sur-Vie (FR); Christophe R. Defurne, La Chapelle-Hermier (FR)

(73) Assignee: CNH France S. A. (FR)

( * ) Notice: Subject to any disclaimer, the term of this patent is extended or adjusted under 35 U.S.C. 154(b) by 0 days.

(21) Appl. No.: 12/998,335

(22) PCT Filed: Oct. 9, 2009

(86) PCT No.: PCT/EP2009/063161
§ 371 (c)(1),
(2), (4) Date: Apr. 8, 2011

(87) PCT Pub. No.: WO2010/040825
PCT Pub. Date: Apr. 15, 2010

(65) Prior Publication Data
US 2011/0197563 A1 Aug. 18, 2011

(30) Foreign Application Priority Data
Oct. 10, 2008 (FR) ...................................... 08 05628

(51) Int. Cl.
*A01D 46/00* (2006.01)
(52) U.S. Cl.
USPC ........................ 56/328.1; 209/624; 198/690.2
(58) Field of Classification Search
USPC . 209/624, 654, 620, 539, 672, 622; 56/328.1, 56/331, 330; 198/367, 690.2, 846; 460/134, 460/146; 700/223; 171/126, 118, 14
See application file for complete search history.

(56) References Cited

U.S. PATENT DOCUMENTS

| | | | | |
|---|---|---|---|---|
| 1,999,673 | A * | 4/1935 | Weber | 209/325 |
| 2,718,110 | A * | 9/1955 | Butler | 171/27 |
| 3,199,604 | A * | 8/1965 | Lorenzen et al. | 171/27 |
| 3,301,331 | A * | 1/1967 | Looker et al. | 171/1 |
| 3,340,935 | A * | 9/1967 | Csimma | 171/14 |
| 3,618,617 | A * | 11/1971 | Gates et al. | 460/146 |
| 3,621,643 | A * | 11/1971 | Gerrans | 56/329 |
| 3,666,017 | A * | 5/1972 | Gates et al. | 171/27 |
| 3,690,383 | A * | 9/1972 | Malley et al. | 171/126 |
| 3,810,512 | A * | 5/1974 | Porter | 171/14 |
| 4,029,005 | A | 6/1977 | Derderian | |
| 4,147,017 | A * | 4/1979 | Cortopassi et al. | 56/16.5 |
| 5,051,172 | A * | 9/1991 | Gilmore | 209/672 |
| 5,480,353 | A * | 1/1996 | Garza, Jr. | 460/148 |
| 6,257,978 | B1 * | 7/2001 | Meester | 460/145 |
| 6,282,877 | B1 * | 9/2001 | Yoder | 56/327.1 |

(Continued)

FOREIGN PATENT DOCUMENTS

| | | |
|---|---|---|
| DE | 2519120 A1 | 3/1976 |
| FR | 2589371 | 5/1987 |
| FR | 2795599 | 1/2001 |

*Primary Examiner* — Arpad Fabian-Kovacs
(74) *Attorney, Agent, or Firm* — Patrick M. Sheldrake

(57) ABSTRACT

The invention includes the steps of disposing at least a portion of the stream containing leafstalks (P) and berries (G) on a continuous conveyor belt (5) in a longitudinal direction (L2), disposing the portion on a discontinuous conveyor belt (6) longitudinally aligned with the continuous belt. The discontinuous belt has vertical (7) openings with a geometry that is configured for enabling berries (G) to pass through them and to retain leafstalks (P) on the discontinuous belt, thereby eliminating leafstalks (P) remaining on the discontinuous belt.

19 Claims, 2 Drawing Sheets

U.S. PATENT DOCUMENTS

| | | | |
|---|---|---|---|
| 7,131,254 B2* | 11/2006 | Flora et al. | 56/328.1 |
| 7,694,502 B2* | 4/2010 | Meester | 56/327.1 |
| 2004/0050029 A1* | 3/2004 | Brannstrom | 56/327.1 |
| 2007/0006563 A1* | 1/2007 | Barr | 56/330 |
| 2007/0006564 A1* | 1/2007 | Barr | 56/330 |
| 2008/0236126 A1* | 10/2008 | Leonini | 56/330 |
| 2008/0283452 A1* | 11/2008 | Barr | 209/606 |
| 2009/0056297 A1* | 3/2009 | Pellenc et al. | 56/330 |
| 2009/0057208 A1* | 3/2009 | Pellenc et al. | 209/606 |
| 2010/0000194 A1* | 1/2010 | Meester | 56/327.1 |
| 2010/0223899 A1* | 9/2010 | Defurne et al. | 56/330 |
| 2011/0112684 A1* | 5/2011 | Pellenc | 700/223 |

* cited by examiner

METHOD FOR ELIMINATING LEAFSTALKS USING CONTINUOUS AND DISCONTINUOUS BELTS

BACKGROUND OF THE INVENTION

The invention relates to a method for eliminating leafstalks from a harvested stream in a berry harvesting machine, an extraction conveyor and an elimination system for implementing that method, and a berry harvesting machine including such an extraction conveyor or such an elimination system.

The invention applies to the field of the mechanised harvesting of fruit growing on tree or bushes, such as grapes, berries, coffee beans, olives or other fruit in particular fruit growing in bunches.

Grapes are conventionally harvested by a shaker assembly that straddles a row of plants to detach the harvest. The harvested stream obtained is then conveyed through the machine to be stored in at least one hopper provided for this purpose or in an associated trailer.

However, because of the action of the shaker assembly, the harvested stream contains, in addition to detached fruit, in particular juice, leaves, leafstalks, wood particles, and bunches of fruit of various sizes.

To eliminate material other than fruit, in particular leaves and wood particles, harvesting machines include a cleaning system which is operable to eliminate said material from the stream by suction before storage.

Harvesting machines can also carry a sorting device that in particular separates the harvested streamed produce as a function of the size of the constituents of said stream. Accordingly, by providing for such sorting, it is possible to separate the portion including large constituents, such as bunches and leaves, in one direction and the rest of the constituents, such as juice, detached fruit, small pieces of waste and leafstalks, in another direction. After this sorting, a suction cleaning device can be oriented over the first portion to remove the leaves without sucking up detached fruit and juice.

Moreover, the search for quality in vinification demands the elimination of leafstalks contained in the harvested stream. However, the prior art makes no provision for such elimination in the harvesting machine either during cleaning or during sorting.

In fact, suction cleaning is based on the differing lift of the constituents of the stream and sorting is based on the differing sizes of said constituents. Now, in the case of leafstalks, their lift and their size are not sufficiently different from those of the berries for the prior art devices to be able to clean or sort one without the other without losing a substantial quantity of fruit.

The invention aims to improve on the prior art by proposing in particular a method for eliminating leafstalks from a harvested stream, said method being implemented in the harvesting machine on recovering the detached berries.

SUMMARY OF THE INVENTION

To this end, according to a first aspect, the invention proposes a method for eliminating leafstalks from a harvested stream in a berry harvesting machine, said method comprising successively the steps of:
  disposing at least a portion of the stream containing leafstalks and berries on a continuous conveyor belt for transport in a longitudinal direction;
  disposing said portion on a discontinuous conveyor belt that is longitudinally aligned with said continuous belt, said discontinuous belt having vertical openings with a geometry that is configured to enable the passage of berries therethrough and to retain leafstalks on said discontinuous belt;
  eliminating leafstalks remaining on said discontinuous belt, wherein the conveyor planes of the continuous and discontinuous belts are substantially coincident.

According to a second aspect, the invention proposes an extraction conveyor for implementing such a method for eliminating leafstalks, said conveyor including a continuous belt motorised for movement in a longitudinal conveying direction between upstream and downstream transverse shafts and, in longitudinal alignment with said continuous belt, a motorised discontinuous belt, said discontinuous belt having vertical openings with a geometry that is configured to allow berries to pass through them and to retain leafstalks on said discontinuous belt, wherein the conveyor planes of the continuous and discontinuous belts are substantially coincident.

According to a third aspect, the invention proposes a system for eliminating leafstalks by implementing the method, said system including a sorting device through which a portion of the stream containing leafstalks and berries can pass, and an extraction conveyor disposed under said sorting device.

According to a fourth aspect, the invention proposes a berry harvesting machine including a motorised support structure and a harvesting assembly mounted on said structure, said harvesting assembly being operable to detach the harvest, said machine including such an extraction conveyor or such a system for eliminating leafstalks that is fed with a harvested stream coming from the harvesting assembly.

Other objects and advantages of the invention will become apparent in the following description given with reference to the appended drawings, in which:

DETAILED DESCRIPTION OF THE INVENTION

Figure 1:
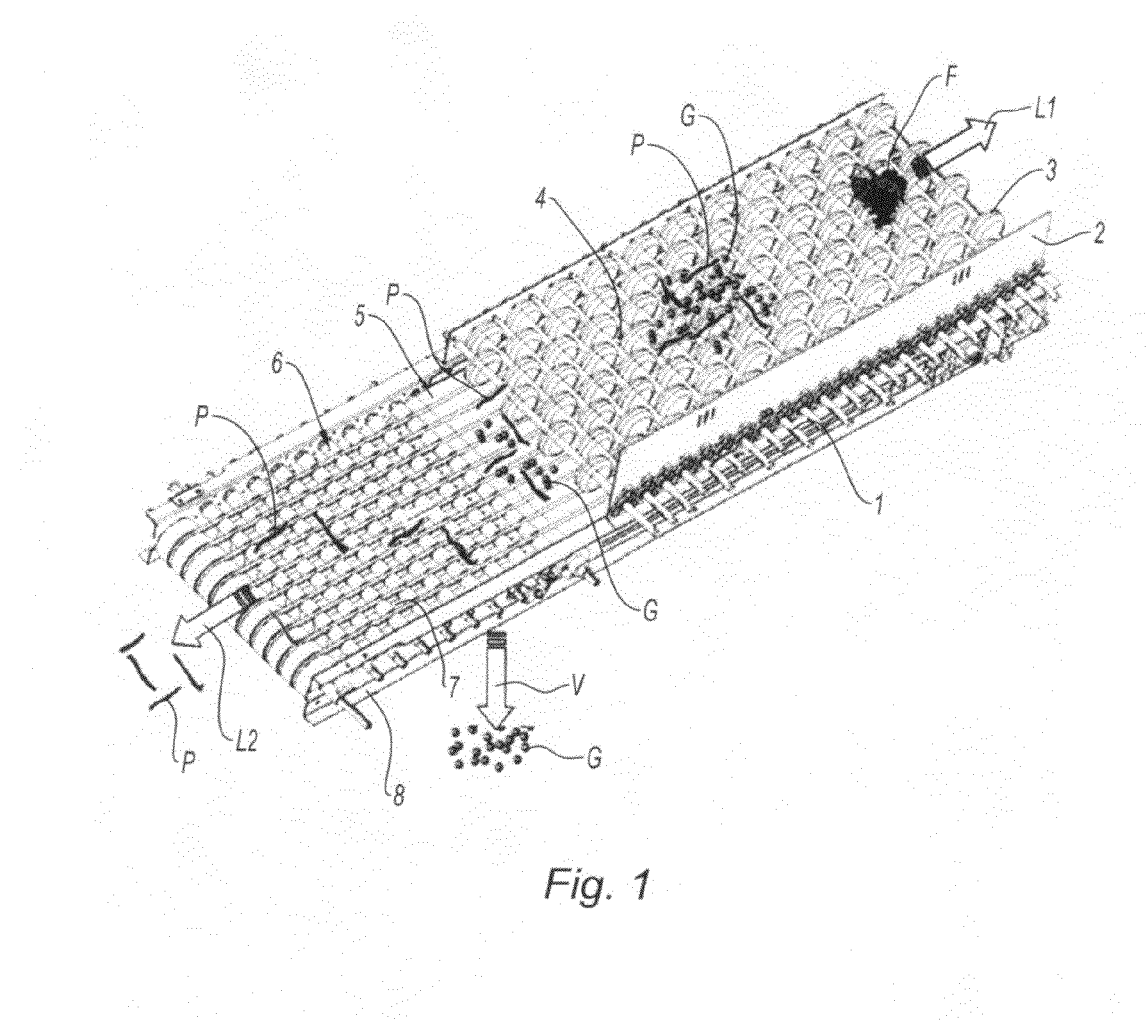
FIG. 1 is a perspective view of a system for eliminating leafstalks according to an embodiment of the invention.

The invention relates to a berry harvesting machine, in particular a grape harvesting machine for the mechanised harvesting of grapes, in particular with a view to their subsequent vinification. A grape harvesting machine conventionally includes a motorised support structure equipped with a driver station and a harvesting assembly mounted on said structure.

The grape harvesting machine is operable to straddle at least one row of vines so that, as it moves, the individual vine stocks are introduced successively into a harvesting assembly operable to detach the harvest. To this end, the harvesting assembly includes vine shakers, in particular a row of shakers on either side of the space into which the individual vine stocks are introduced.

The grape harvesting machine also includes a system for continuously recovering the detached harvest, which contains, in addition to detached grapes G, in particular leafstalks P, juice, leaves, wood particles, and bunches F of various sizes. In one embodiment, the system includes two bucket conveyors configured for recovering the detached harvest below the introduction space and to convey said harvest into an upper portion of the grape harvesting machine for storage of said harvest in at least one hopper.

In the context of vinification of grapes, it is desirable to eliminate leafstalks P contained in the harvested stream so that said harvest can be stored substantially free of said leafstalks.

To this end, there is described hereinafter a system for eliminating leafstalks P, which is configured to be mounted in the machine and to be fed with the harvested stream coming from the harvesting assembly. The elimination system can be fed directly by the stream coming from the harvesting assembly. Alternatively, it can be fed via a cleaning device and/or a sorting device.

The elimination system shown includes a sorting device fed with the harvested stream and through which a portion of said stream containing leafstalks P and detached berries G can pass. This elimination system also includes, disposed under said sorting device, an extraction conveyor that is operable to recover on it the stream portion that has passed through and to remove from said conveyor said constituents of the portion that has passed through other than the leafstalks P. Accordingly, by thereafter removing the leafstalks P remaining on the conveyor, the system allows for the elimination of the leafstalks P from the harvested stream while enabling the recoverage of the detached grapes G in order to store them.

There is described hereinafter, with reference to the Figures, an embodiment of a sorting device operable to implement the method of eliminating leafstalks P. The device is operable to sort the harvested stream into two layers as a function of the size of the constituents of said stream. The upper layer, including in particular bunches of fruit F, is conveyed over the sorting device and the lower layer, including in particular detached grapes G and leafstalks P, passes through said device. Actually, because the harvested stream is tipped onto the sorting device with no particular orientation of the leafstalks P, it is not possible to substantially retain said leafstalks in the first layer.

The sorting device includes at least two longitudinally spaced transverse sorting bars 1. In FIG. 1 there are twenty-two sorting bars 1, but their number may be adapted such that the length of the device is sufficient to perform the sorting.

The bars 1 are animated with a cyclic relative movement that is operable to provide for longitudinal displacement L1 of the stream over said bars and for passage between them of the portion that, when it has passed through, includes detached grape berries G and leafstalks P. Thus detached grapes G and leafstalks P can be recovered on the extraction conveyor.

Because they come into contact with the harvested stream, the sorting bars 1 are preferably made from a corrosion-resistant material, in particular a stainless metal or a synthetic material.

In the embodiment represented, the sorting bars 1 are mounted on a frame 2 to be driven conjointly in rotation about parallel transverse axes, a motor being associated with said frame for this purpose. Furthermore, the stream conveyed on the sorting bars 1, which primarily includes bunches of fruit F of various sizes, can be ejected at the end of the movement into a storage hopper provided beyond the downstream portion of the sorting device.

Alternatively, as the striving for quality in vinification requires debunching of the stream of grapes, the stream that is conveyed on the sorting bars 1 can feed a device for separating grapes attached to stalks. Moreover, to facilitate recovery of the ejected stream, the downstream end of the sorting device can extend beyond the extraction conveyor.

The bars 1 carry members 3 that have an external envelope that is configured for enabling longitudinal movement of the stream and to form passages 4 for the portion that has to pass through. In particular, the passages 4 can be formed longitudinally between a member 3 and the adjacent bars 1 and/or transversely between two adjacent members 3 of a respective bar 1.

To this end, the members 3 of a bar 1 can be offset transversely relative to the members 3 of the adjacent bars 1. Moreover, to modify the geometry of the passages 4 and thus to adapt them to the size of the grapes G, the distance between centres of the sorting bars 1 and/or their respective transverse positions are adjustable. Furthermore, as a function of the characteristics of the stream to be separated, the geometry of the passages 4 can vary as a function of the longitudinal position of the sorting bars 1 on the frame 2.

In FIG. 1, the envelope of the members 3 has a revolution geometry which, when they rotate, causes longitudinal movement of the stream with limited mechanical forces exerted on the grapes G. Moreover, the members 3 of two adjacent bars 1 are offset transversely by a step greater than the transverse dimension of the members 3. Thus the configuration represented is obtained by providing a distance between the centres of the bars 1 that is greater than half the diameter of the members 3. Furthermore, in this configuration, alternate sorting bars 1 are disposed transversely in exactly the same manner.

Alternatively, the envelope of the members 3 can have a geometry that is not a revolution geometry about the rotation axis of the bars 1, so that the sizes of the passages 4 vary during the cyclic movement. In particular, the geometry of the envelope of the members 3 can have two different radial dimensions, for example being inscribed within an ellipse, a triangle, a rectangle or a square.

In an embodiment that is not represented, the sorting device can include a destemming device that separates grapes from bunches.

Figure 2:
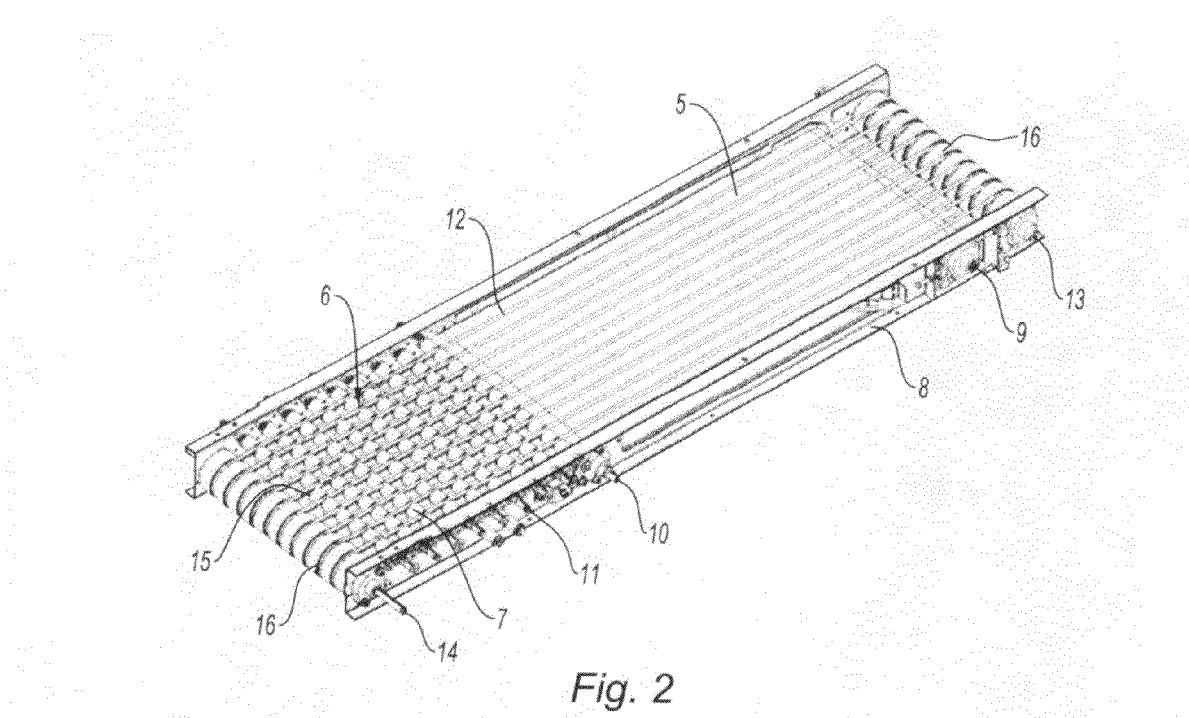
FIG. 2 is a perspective view of an extraction conveyor used in the elimination system of FIG. 1.
Figure 3:
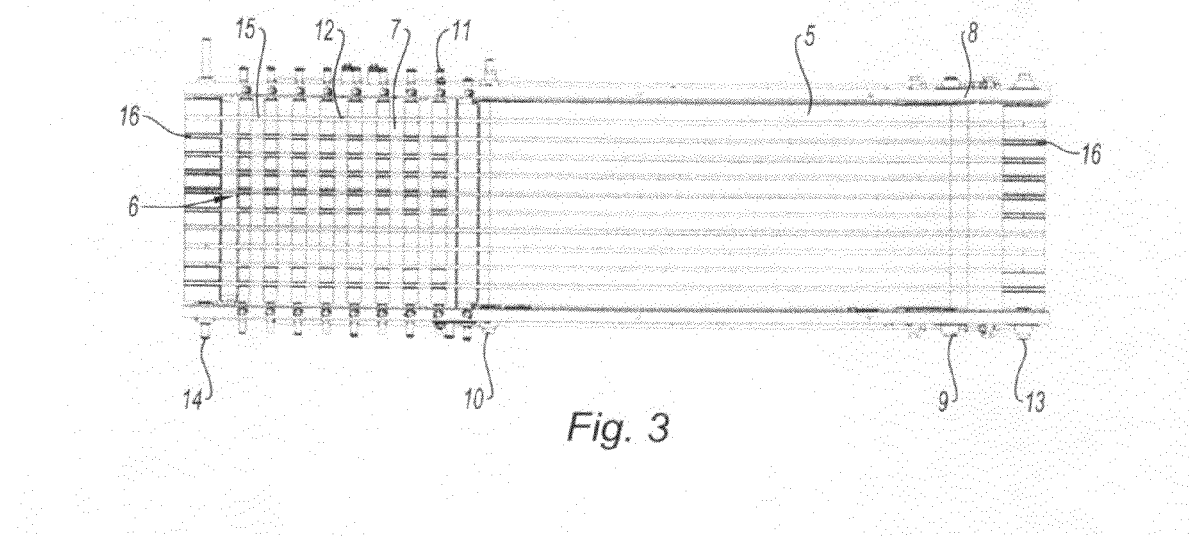
FIG. 3 is a plan view of the extraction conveyor of FIG. 2.

There is described hereinafter, in particular with reference to FIGS. 2 and 3, one embodiment of an extraction conveyor that successively:

receives the harvest portion that has passed through the sorting device on a continuous conveyor belt 5 in a longitudinal direction L2; and disposes this portion that has passed through on a discontinuous conveyor belt 6 that is in longitudinal alignment with said continuous belt, said discontinuous belt having vertical openings 7 with a geometry that is adapted to enable the passage of grapes G therethrough and to retain leafstalks P on said discontinuous belt.

Thus the continuous belt 5 disposes the leafstalks P substantially in the plane of said belt. The discontinuous belt 6 then leaves the leafstalks P flat, with the grapes G removed by gravity through it. Seen in plan view, the dimension of the leafstalks P, i.e. their length, is substantially greater than the dimension of the grapes G, i.e. their diameter. It is therefore possible to separate these constituents by virtue of their different sizes through openings 7 of appropriate geometry that extend in a direction V perpendicular to the plane of the conveyor.

Alternatively, the extraction conveyor can be used without providing an upstream sorting device, and can be fed with at least a stream portion containing leafstalks P and grapes G.

In the embodiment represented, the belts 5, 6 are mounted on the same structure 8 with which the frame 2 of the sorting device is associated, this structure 8 further enabling the assembly of the elimination system into the harvesting machine. The continuous belt 5, which in particular can be made from a waterproof material compatible with the harvested stream, is driven in a longitudinal conveying direction L2 between an upstream transverse shaft 9 and a downstream transverse shaft 10, which are mounted on the structure 8.

Like the continuous belt 5, the discontinuous belt 6 is driven to run in a longitudinal conveyor plane. The conveyor planes can be substantially coincident or slightly offset in the vertical direction, to avoid the leafstalks P tilting out of the conveyor plane on passing from the continuous belt 5 to the discontinuous belt 6.

The stacking of the sorting device over the extraction conveyor is such that the portion that has passed through, drops onto the continuous belt 5 to be conveyed by it over a sufficient distance for the leafstalks P to take a flat position. Furthermore, the sorting device and the extraction conveyor are mounted the one over the other with parallel but opposite conveyor directions L1, L2.

The discontinuous belt 6 in the Figures includes a plurality of longitudinally spaced bars 11 and, around said bars, driven and transversely spaced longitudinal bands 12 running between an upstream transverse shaft 13 and a downstream transverse shaft 14. More precisely, there are nine bars 11 and ten bands 12, the length of the discontinuous belt 6 being adapted to enable separation of leafstalks P and grapes G.

In this embodiment, each vertical opening 7 is therefore delimited transversely by two adjacent bands 12 and longitudinally by two adjacent bars 11. In particular, the transverse dimension of the bands 12 is small, for instance less than one centimeter. The openings 7 can be substantially square with a side length greater than the greatest dimension of the grapes G but smaller than the length of the leafstalks P. For example, the side length can be of the order of 30 or 35 mm.

Furthermore, downstream of the continuous belt 6, the leafstalks 5 are taken up by the bands 12 while they are lying flat, such that they can be conveyed in said conveyor plane to the downstream end of the discontinuous belt 6. This reduces the risk of leafstalks P passing through the openings 7. Moreover, this risk is further limited in that the leafstalks P are relatively sticky because they have been wetted by the grape juice, and the material forming the bands 12 can be adapted to improve the retention of the leafstalks P on it.

In particular, the material forming the bands 12 can be waterproof and have a reduced stiffness, in particular have some elasticity. Moreover, the exterior surface of the bands 12 can be grained or have some other appropriate surface state. In one embodiment, the bands 12 can be formed with a belt, in particular of cylindrical section, which can be made of an elastic synthetic material suitable for contact with the harvest portion that has passed through. Moreover, in a manner that is not shown in the drawings, the elimination system can include a bib, in particular produced in a semi-rigid synthetic material, which is associated with the structure 8 to rub on the bands 12 in the vicinity of the downstream shaft 14 to eliminate leafstalks P on said bands.

The openings 7 can be provided with vertical walls for guiding the grapes G through them, said walls forming a guide duct. This prevents the grapes G being taken up by the lower, return run and the grapes G can therefore be recovered beyond the openings 7 either by a conveyor or directly into a hopper for storing the harvest.

The extraction conveyor can include means for adjusting the longitudinal spacing of the bars 11 and/or the transverse spacing of the bands 12 so as to modify the geometry of the vertical openings 7 relative to that of the grapes G. Moreover, the cross section of the bands 12 and their number can also be adapted to the characteristics of the harvested stream to be processed. Furthermore, the geometry of the vertical openings 7 can vary along the discontinuous belt 6.

In the embodiment shown, the bars 11 are fixed against rotation and have grooves 15 for guiding the bands 12 in translation. Hence, the transverse spacing between the bands 12 can be maintained and this facilitates the disposition of said bands in longitudinal alignment with the continuous belt 5. Furthermore, the upstream shaft 13 and the downstream shaft 14 also have grooves 16 for guiding the bands 12 in translation.

In one embodiment, the extraction conveyor can also include means for adjusting the respective rotation speeds of the continuous belt 5 and the bands 12, i.e. the respective conveying speeds of the discontinuous belt 6 and the continuous belt 5. Thus the leafstalks P can be separated using conveying speeds that are suited to the stream and which can be the same or different for each belt 5, 6.

In the embodiment represented, the upstream shaft 13 of the bands 12 is disposed behind the upstream shaft 9 of the continuous belt 5, said bands extending over said continuous belt. In particular, the bands 12 are disposed on the upper surface of the continuous belt 5, for example being lightly and elastically pressed onto said belt.

Thus in this embodiment, leafstalks P are first taken up on the continuous belt 5 and conveyed conjointly by the bands 12 and said continuous belt and then conveyed only by said bands along the discontinuous belt 6.

The speed of the bands 12 can be identical to that of the continuous belt 5. Alternatively, the bands 12 can move faster than the continuous belt 5.

In an embodiment that is not represented, the upstream shaft 13 of the bands 12 can be disposed in front of the downstream shaft 10 of the continuous belt 5 and in longitudinal alignment with said downstream shaft. In particular, the longitudinal spacing between the upstream and downstream shafts is limited to prevent the conveyed stream dropping between the two belts 5, 6. In this embodiment, it can be considered to mechanically dissociate the belts 5, 6, in particular by having those being mounted on respective support structures.

The invention claimed is:

1. A method for eliminating leafstalks (P) from a harvested stream in a berry (G) harvesting machine, said method comprising the steps of:
    disposing at least a portion of the stream containing leafstalks (P) and berries (G) on a continuous conveyor belt (5) for transport in a longitudinal direction (L2);
    disposing said portion on a discontinuous conveyor belt (6) that is longitudinally aligned with said continuous belt, wherein the discontinuous belt (6) includes a plurality of longitudinally spaced bars (11) and, around said bars, transversely spaced longitudinal bands (12), said longitudinal bands extending along both the continuous and discontinuous conveyor belts between an upstream transverse shaft (13) and a downstream transverse shaft (14), said discontinuous belt having vertical openings (7) with a geometry that is configured to enable the passage of berries (G) therethrough and to retain leafstalks (P) on said discontinuous belt, such that leafstalks P are first taken up on the continuous belt 5 and conveyed conjointly by the bands 12 and said continuous belt, and then the leafstalks P are conveyed only by said bands along the discontinuous belt 6; and
    eliminating leafstalks (P) remaining on said discontinuous belt, wherein the conveyor planes of the continuous and discontinuous belts are substantially coincident.

2. A method for eliminating leafstalks according to claim 1, wherein the conveying speeds of the continuous belt (5) and the discontinuous belt (6) are different.

3. A method for eliminating leafstalks according to claim 1, wherein the geometry of the vertical openings (7) is variable along the discontinuous belt (6).

4. A method for eliminating leafstalks according to claim 1, further including a preliminary step for feeding the harvested stream onto a sorting device through which a stream portion containing leaf stalks (P) and berries (G) can pass, the portion that has passed through being recovered on the continuous belt.

5. A method for eliminating leafstalks according to claim 1, further comprising an extraction conveyor configured to include:
- a continuous belt (5) motorised for movement in a longitudinal conveying direction between upstream (9) and downstream (10) transverse shafts; and
- in longitudinal alignment with said continuous belt, a motorised discontinuous belt (6), said discontinuous belt having vertical openings (7) with a geometry that is configured to allow the passage of berries (G) therethrough and to retain leafstalks (P) on said discontinuous belt, wherein the conveyor planes of the continuous and discontinuous belts are substantially coincident.

6. A method for eliminating leafstalks according to claim 5, wherein the bars (11) have grooves (15) for guiding the bands (12) in translation.

7. A method for eliminating leafstalks according to claim 5, wherein the extraction conveyor is further configured to adjust the longitudinal spacing of the bars (11) and/or the transverse spacing of the bands (12) so as to be able to modify the geometry of the vertical openings (7).

8. A method for eliminating leafstalks according to claim 5, wherein the upstream shaft (13) of the bands (12) is disposed in front of the downstream shaft (10) of the continuous belt (5) and longitudinally aligned with said downstream shaft.

9. A method for eliminating leafstalks according to claim 5, wherein the upstream shaft (13) of the bands (12) is disposed behind the upstream shaft (9) of the continuous belt (5), said bands extending over a to surface of said continuous belt.

10. A method for eliminating leafstalks according to claim 5, wherein the extraction conveyor is further configured to adjust the respective conveying speeds of the continuous belt (5) and the discontinuous belt (6).

11. A method for eliminating leafstalks according to claim 5, wherein the openings (7) are equipped with vertical walls for guiding the berries (G) through them.

12. A method for eliminating leafstalks according to claim 1, further configured to include a sorting device through which a stream portion containing the leafstalks (P) and berries (G) can pass and, disposed under said sorting device, an extraction conveyor.

13. A method for eliminating leafstalks according to claim 12, wherein the sorting device is configured to include at least two transverse sorting bars (1) that are spaced longitudinally, said bars being driven with a cyclic relative movement that is operable to enable longitudinal movement of the stream on said bars and passage between them of the portion of the stream.

14. A method for eliminating leafstalks according to claim 13, wherein the sorting bars (1) are driven in rotation about transverse axes, said bars carrying members (3) that have an envelope which is operable to move the stream in a longitudinal direction and to form passages (4) for the portion that is to pass through.

15. A method for eliminating leafstalks according to claim 14, wherein members (3) of one bar (1) are offset transversely relative to the members (3) of the adjacent bars (1), the passages (4) being formed longitudinally between a member (3) and the adjacent bars (1) or transversely between two adjacent members (3) of a respective bar (1).

16. A method for eliminating leafstalks according to claim 14, wherein the envelope of the members (3) has a geometry that is not a revolution geometry about the rotation axis of the bars (1) so as to vary the sizes of the passages (4) during the cyclic movement.

17. A method for eliminating leafstalks according to claim 14, wherein the envelope of the members (3) has a revolution geometry.

18. A method for eliminating leafstalks according to claim 13, wherein the distance between sensors of the sorting bars (1) or their respective transverse positions are adjustable in order to modify the geometry of passages (4).

19. A method for eliminating leafstalks according to claim 13, wherein the sorting device and the extraction conveyor have opposite conveyor directions.

* * * * *